Dec. 1, 1953           F. COREY           2,661,205
AUXILIARY SPRING FOR AUTOMOBILE LEAF SPRINGS
Filed Oct. 19, 1949
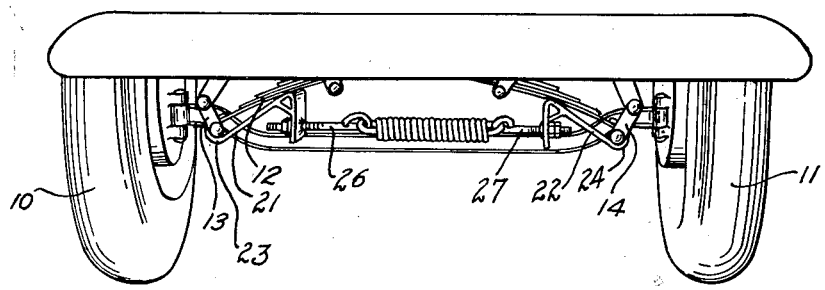
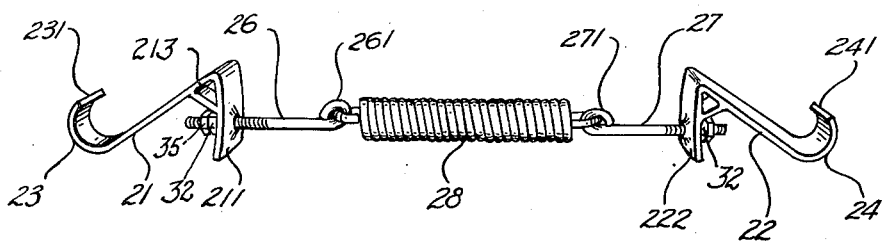
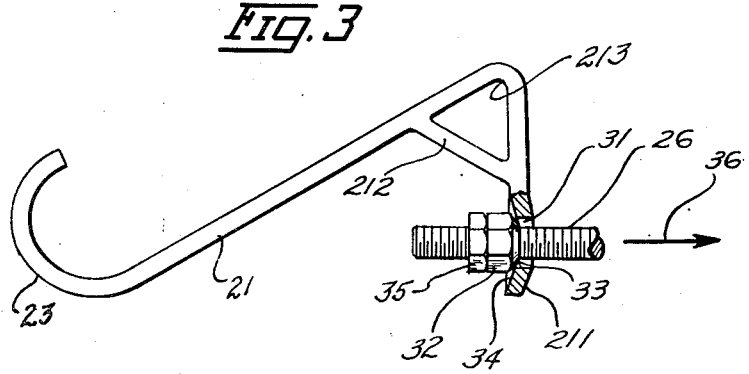
INVENTOR.
Flournoy Corey.

Patented Dec. 1, 1953

2,661,205

UNITED STATES PATENT OFFICE 2,661,205

AUXILIARY SPRING FOR AUTOMOBILE LEAF SPRINGS

Flournoy Corey, Cedar Rapids, Iowa

Application October 19, 1949, Serial No. 122,288

2 Claims. (Cl. 267—28)

This invention relates to supporting springs for motor vehicles and has particular relation to an auxiliary spring for automobile leaf springs.

The leaf springs of automobiles and the like are likely to lose their arch in use, thus permitting the vehicle to sag and permitting the springs or the chassis to strike the axle when the vehicle goes over a bump.

Various devices have been suggested for the purpose of supplementing leaf springs of vehicles, and in one form of such devices, clips or brackets are provided which have curved outer ends adapted to extend over the ends of the leaf spring. Rods are passed through the inner ends of these brackets and the inner ends of the rods connected by a coil spring which acts, under straightening out of the leaf spring, to resiliently resist such straightening out. A take-up device is employed so that any desired degree of initial tension may be placed on the coil spring to cause the leaf spring to assume a more curved or arched position, and cause the coil spring to come into action to a greater or lesser degree as desired, and at any desired time in the flattening of the leaf spring. Such a device is shown in Patent No. 246,479 to Ronella L. Doble and others.

A difficulty or disadvantage of devices of this character is that the rods at their junction with the clips or brackets are subject to considerable bending strain because the brackets tend to rotate with the leaf spring ends on flexing of the leaf spring. Such rotational movement of the brackets is in opposite directions at any given time during flexing. There is an opposite, approximately arcuate movement of translation of the leaf spring ends as well. The rods and coil spring, however, tend to remain substantially in a horizontal line which moves up and down bodily in vertical movement of translation substantially equally through the length of these members. Thus the junction of the rods and the brackets is subjected to a severe bending movement which may damage or break either or both of these members or damage or destroy the connecting means between them.

It is an important object of my invention to provide connecting means for devices of the character here considered which will accommodate the opposed rotational movement of the brackets to the above described movement of translation of the rods and springs without destructive bending or undue wear of these parts.

Other and further features and objects of the invention will be more apparent to those skilled in the art upon a consideration of the accompanying drawing and following specifications, wherein is disclosed a single exemplary embodiment of the invention, with the understanding, however, that such changes may be made therein as fall within the scope of the appended claims, without departing from the spirit of the invention.

In said drawings:

Figure 1 is a view in perspective of the front end of a vehicle, illustrating, in particular, the leaf spring and an auxiliary spring constructed according to one embodiment of my invention.

Figure 2 is an enlarged view in perspective of the brackets, the adjusting bolts, and the coil spring comprising the auxiliary spring illustrated in Figure 1 and constructed according to my invention, and Figure 3 is a view in enlarged detail of one of the brackets with a portion of the bracket broken away to show how the adjusting bolt is engaged to the bracket.

Referring, then, to the drawings:

The device to which my auxiliary spring may be applied is, for exemplary purposes an automotive vehicle, the wheels of which are indicated at 10 and 11, and the conventional transverse leaf spring 12 of which is engaged at its middle portion, to the frame of the vehicle and, at its ends, to the axle by means of the usual clevis members 13 and 14.

An auxiliary spring, constructed according to my invention, employs a pair of brackets 21 and 22. These brackets, as may be observed by reference to Figure 1, have hooked end portions 23 and 24 adapted to be engaged over the ends of the leaf spring 12, the projecting ends 231 and 241 of the hooked end portions preferably being of sufficient length to project between the clevis members.

The adjacent ends of the pair of brackets are bent downwardly, as indicated at 211 and 222, so as to be approximately parallel. Holes 31 are provided in these adjacent ends, through which the adjusting bolts 26 and 27 may be passed. These bolts are provided with eyes at their inner ends, as indicated at 261 and 271, for engagement with the opposed end loops of the coil spring 28.

The sharp bend 213 of each of the brackets 21 and 22 is preferably reinforced by means of a tie piece 212. The opening 31 through the vertical portion 221 of the bracket is larger than the bolt 26, so that, in use, the bolt need not normally touch the side of the opening particularly if there is any centering means supplied to center the bolt through the tension of the coil spring.

In practicing my invention, I provide biasing means to cause the stem of the bolt to be centered in the opening and of equal importance, I provide means for permitting free rocking movement of the bolt with reference to the bracket. I also enlarge the bearing surface.

In order to permit the free rocking motion, I provide at least two members. One of the members might be considered as a concaved member, and the other the convexed member adapted to mate with it. I preferably employ the concavity on the outer face of the portion of the bracket to which tension from the coil spring is transferred. The rod member which connects with this bracket has a member or portion which has a convex face adapted to bear against the concave face of the bracket whereby tension of the coil spring causes the convex face of the rod member to be seated in the concave face of the bracket. This relation permits free swiveling of the rods with reference to the brackets, and thus prevents undue wear or bending of the parts.

To secure the above relation, in the structure here shown the nut 32 is beveled on its inner face, as indicated at 33, and the outer face of the downwardly extending ear 221 of the bracket 21 is dimpled or recessed, as indicated at 34, so that when tension is applied by the spring to the bolt and in the direction of the arrow 36, the beveled face of the nut 32 bears against the dimpled outer wall of the downwardly extending portion of the bracket 211, and thus causes the bolt 26 to be approximately centered in the opening 31, so that the threads of the bolt itself do not touch the sides of the opening, and, furthermore, the bolt may swivel freely on movement of the ends of the leaf springs as in hitting a bump or dropping into a hole or the like. Therefore bending moment in the bolts is eliminated and, further, wear of the bolts against the brackets is likewise eliminated. The beveled nut 32 is locked in position by the jam nut 35.

This feature has been found, by actual experience, to be extremely effective in preventing damage to the bolts and in livening up the action of the auxiliary spring.

Although I have described a specific embodiment of my invention, it is apparent that modifications thereof may be made by those skilled in the art. Such modifications may be made without departing from the spirit and scope of my invention as set forth in the appended claims.

I claim as my invention:

1. A device for modifying the spring action of a semi-elliptical leaf spring having shackle bolt formations disposed at each end thereof, comprising a pair of brackets each engaging, respectively, one of said shackle bolt formations; each of said brackets consisting of a flat strip of metal having a hook portion at one end thereof for engaging one of said shackle bolt formations, an inclined portion extending from said hook portion upwardly toward the lowermost face of said elliptical leaf spring, said inclined portion having a flat surface adjacent the uppermost end thereof and spaced a substantial distance from said hook portion for engaging the lowermost face of said spring, and a downwardly extending portion secured to the uppermost end of said inclined portion and provided with an opening; rod members each having one end disposed in an opening of each of said bracket downwardly extending members and a free end having a hook formed thereon; means for adjustably securing the end of said rod disposed in said opening to said bracket; and a longitudinally extensible spring means connected to the hook portions of said rod members whereby said spring means may simultaneously exert forces on the shackle bolt formations of said elliptical spring and on the lowermost face thereof at points spaced inwardly from said shackle bolt formations.

2. A device as set forth in claim 1 wherein a flat web portion is secured to and extends between the opposed faces of said inclined and downwardly extending portions of each of said brackets having a rounded depression formed around the opening provided therein, said rod members being threaded and a bolt means engaging each of said threaded portions for securing each rod member to the bracket through which it extends, the face of said bolt adjacent said rounded portion of said downwardly extending member being rounded.

FLOURNOY COREY.

References Cited in the file of this patent

UNITED STATES PATENTS

| Number | Name | Date |
|---|---|---|
| 365,968 | Chase | July 5, 1887 |
| 407,559 | Wells | July 23, 1889 |
| 1,026,496 | Collette | May 14, 1912 |
| 1,287,034 | Johnson | Dec. 10, 1918 |
| 1,613,198 | Roberson | Jan. 4, 1927 |
| 1,791,661 | Cunningham | Feb. 10, 1931 |
| 1,886,273 | Thomson | Nov. 1, 1932 |
| 2,446,395 | Wallace | Aug. 3, 1948 |
| 2,457,243 | Kucera | Dec. 28, 1948 |

FOREIGN PATENTS

| Number | Country | Date |
|---|---|---|
| 488,399 | Germany | Dec. 27, 1929 |